INVENTORS
HARRY R. PAYNE
ARTHUR L. RANKIN, JR.

BY Cameron, Kerkam + Sutton
ATTORNEYS

INVENTORS
HARRY R. PAYNE
ARTHUR L. RANKIN, JR.
BY
Cameron, Kerkam & Sutton
ATTORNEYS

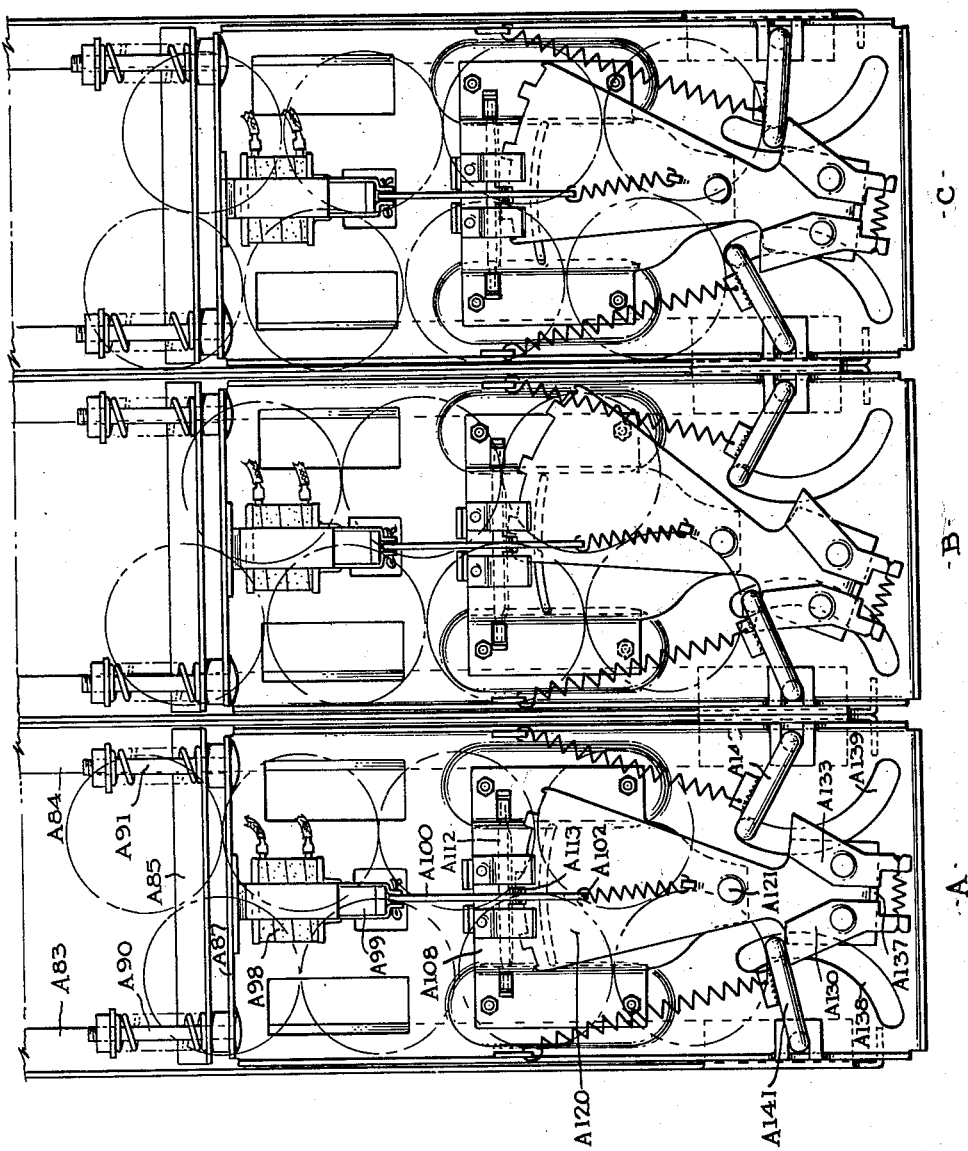

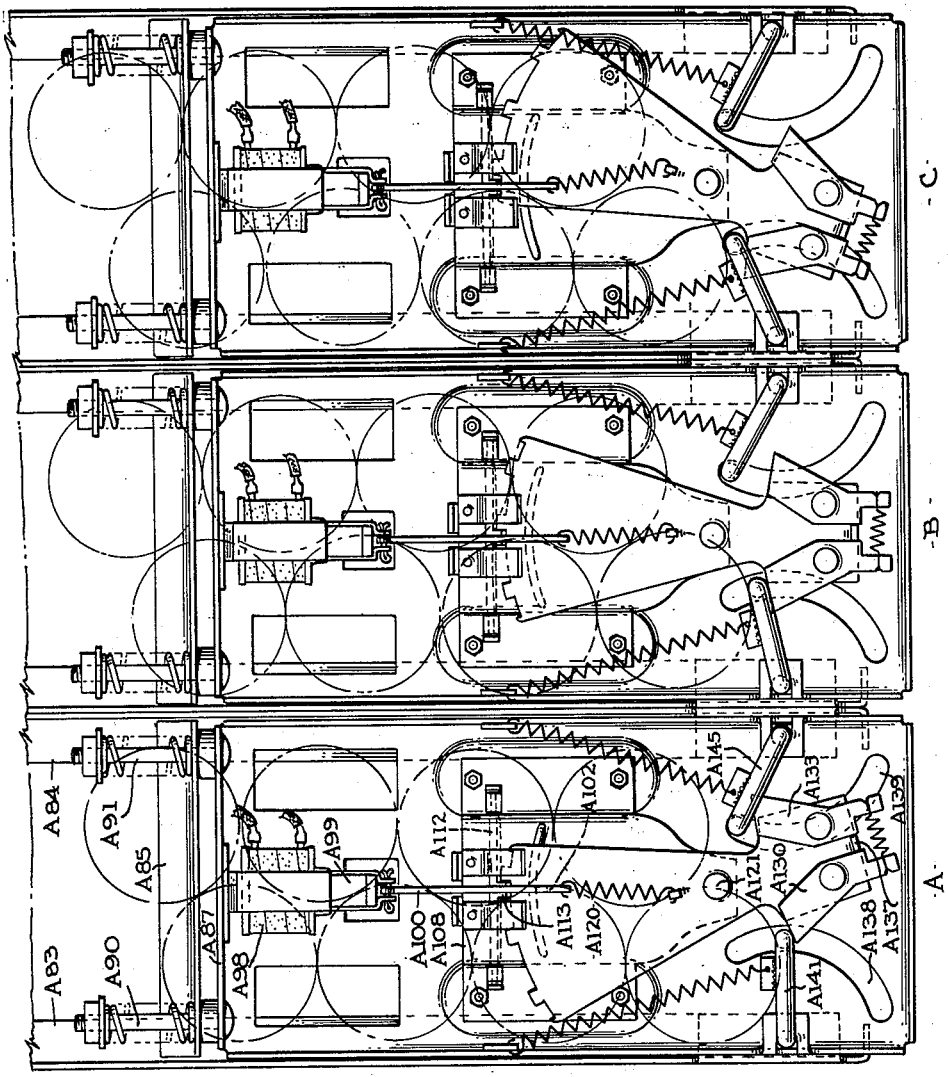

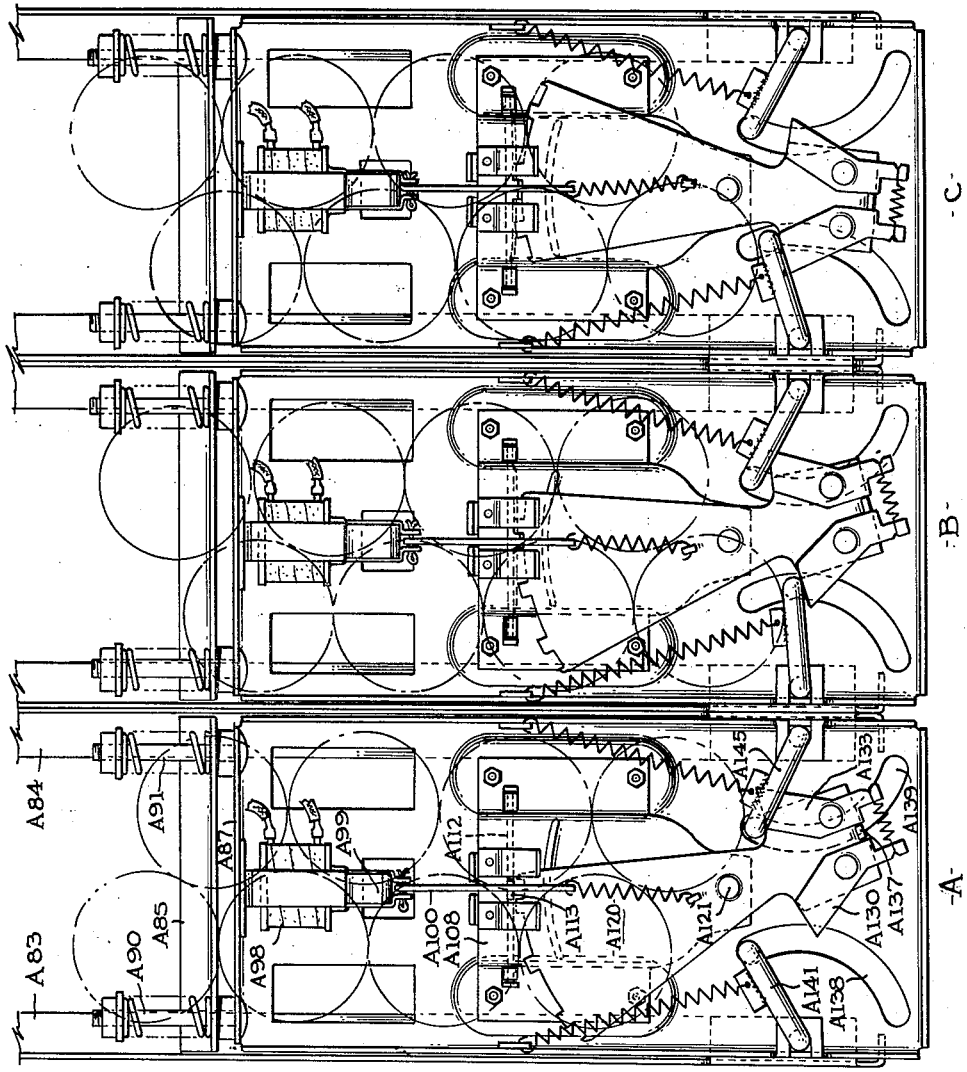

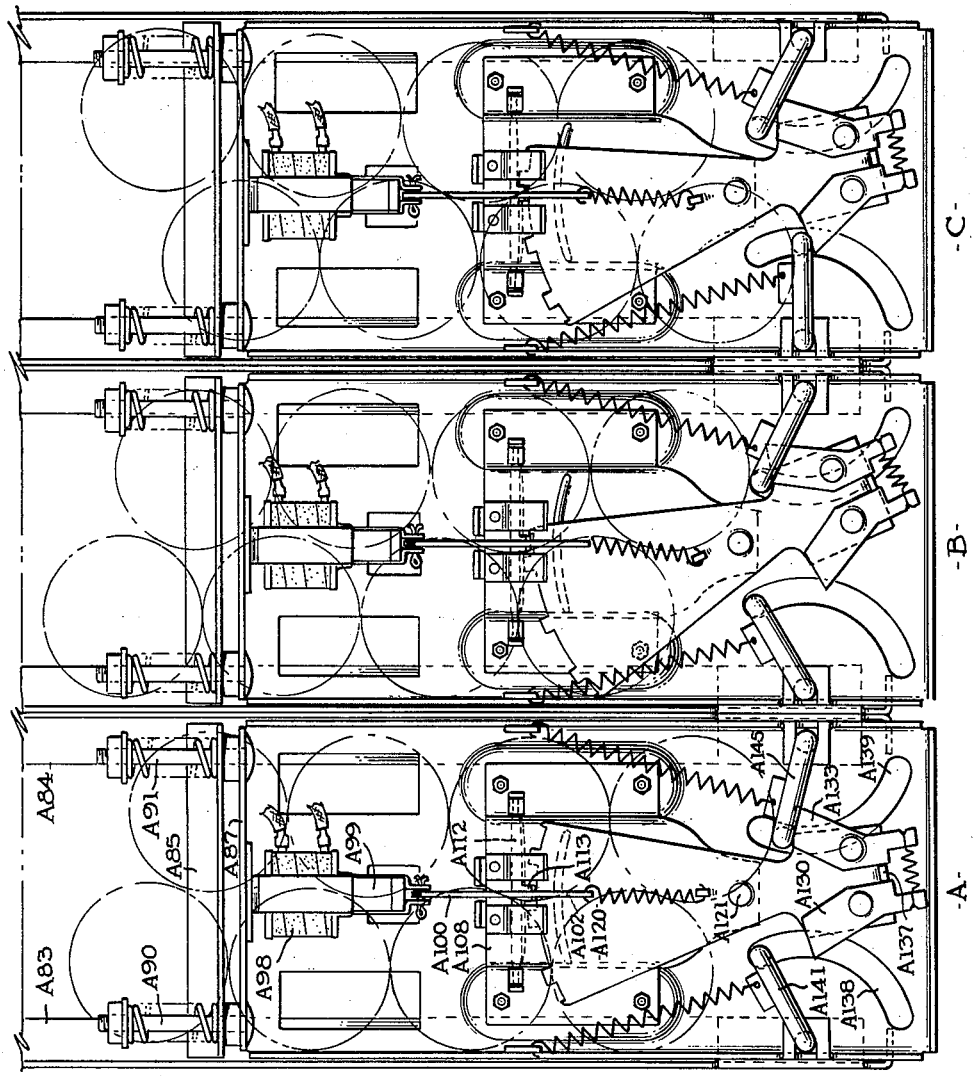

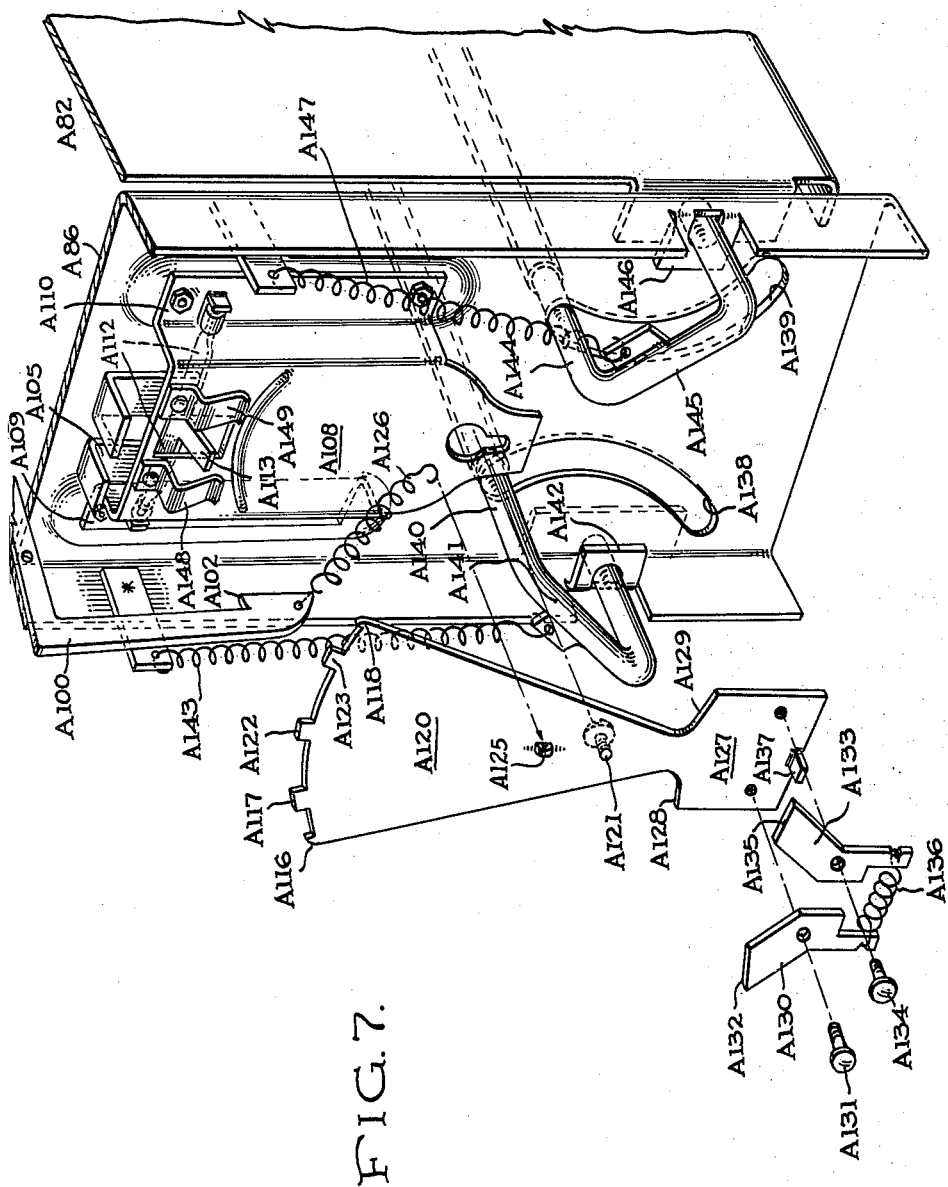

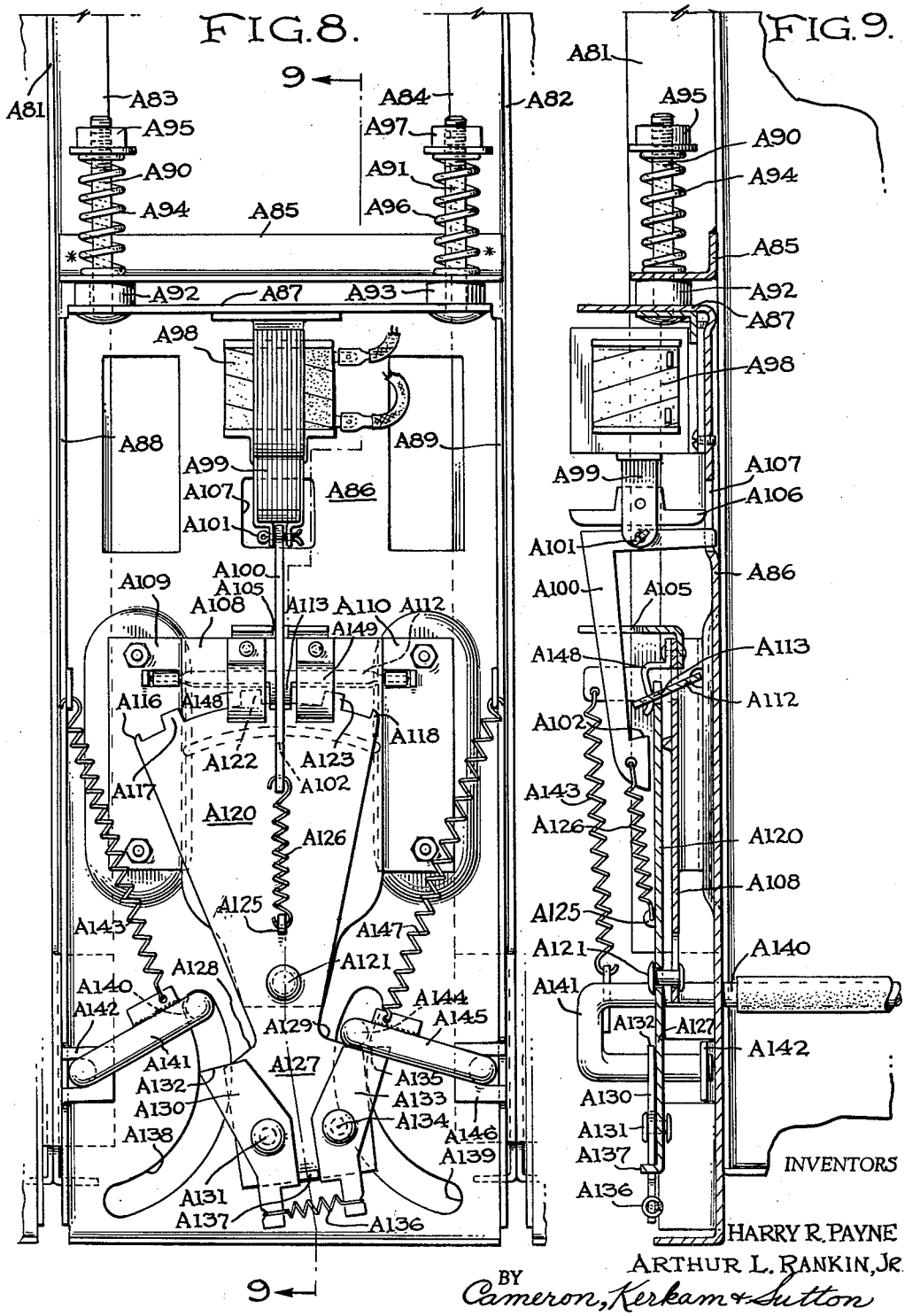

United States Patent Office 3,107,813
Patented Oct. 22, 1963

3,107,813
DISPENSING MECHANISMS FOR ARTICLES IN SIDE BY SIDE STAGGERED STACKS
Harry R. Payne and Arthur L. Rankin, Jr., both of Chattanooga, Tenn., assignors to Cavalier Corporation, Chattanooga, Tenn., a corporation of Tennessee
Filed Sept. 11, 1961, Ser. No. 137,113
4 Claims. (Cl. 221—67)

This invention relates to dispensing mechanisms for dispensing a single article at a time from a plurality of articles arranged in side by side stacks with the bottles in each stack arranged in overlapping staggered relationship.

Even more particularly this invention relates to mechanisms for dispensing a single article at a time from stacks of articles in which the articles are arranged in overlapping staggered relationship in which the dispensing mechanisms are actuated by the weight of the articles in the staggered stack of articles and release of a dispensing mechanism for dispensing a single article at a time from the staggered stacks of articles is actuated by electrically energized means.

Even more particularly still this invention relates to dispensing mechanisms for dispensing one at a time an article of substantially cylindrical form such as a single can or bottle from staggered stacks of articles, such cans or bottles being hereinafter referred to for convenience as bottles, in which the weight of the bottles in each stack actuates the dispensing mechanism for that stack and each mechanism is released in turn for the dispensing of a bottle by electrically energized means. The electrically energized means may be energized from any suitable source and controlled by any suitable switch mechanism, preferably actuated by the deposit of a coin.

At the present time articles such as bottles of popular beverages are usually stored for selective sale in refrigerated cabinets with coin release mechanisms for dispensing one bottle at a time. In these cabinets the bottles may be disposed on sloping shelves arranged one shelf above the other or the bottles may be arranged in vertical staggered stacks in side by side bins. In the first type of dispenser in which the bottles are arranged on sloping shelves the lowermost bottle on each shelf may move by gravity to a position where it can be withdrawn manually by the purchaser after a coin has been deposited to release an unlocking mechanhism allowing withdrawal of one bottle at a time.

In the second type of apparatus in which the bottles are arranged vertically in columns in staggered stacks in side by side bins various devices have been used for releasing one bottle at a time on the deposit of a suitable coin. Usually this release mechanism is driven by an electric motor and moves from beneath one bottle in the selected column in the selected staggered stack to a position beneath the next bottle to prevent more than one bottle from being dispensed at a time.

The first type of dispenser has advantages of relatively simple construction and the merchandise is visible for selection by the purchaser. A variety of types of beverage can be sold in this machine depending only on the number of vertical shelves provided. This multiplicity of variety is disadvantageous to the bottler who may place the machine on location since the machine can then be used for vending products other than those of the bottler.

In the second type of dispenser in which the bottles are arranged in staggered stacks it has been found that six double column staggered stacks side by side is the limit to the practical size of the cooler, doors and the like of the apparatus. The number of selections is therefore limited in a machine of maximum size to six if each staggered stack has individually controlled dispensing mechanism. This is advantageous to the bottler. The machine can hold only six different selections and most bottlers sell that many. There is therefore less opportunity for a competitive bottler to get his products into the machine. Further, more bottles can be stored in the staggered stack type dispenser than in the shelf type machine which is advantageous. However, in the staggered stack machine, the delivery mechanism is usually motor-driven; it is expensive; and there is always the possibility of a mechanical jam of the mechanism in the automatic, positive drive of the dispensing mechanism for the bottles.

It is even more advantageous to the bottler if the staggered stacks dispense a single bottle at a time in sequence so that only a single beverage can be sold.

Heretofore it has been proposed to dispense from stacks of articles or bottles less than two diameters of the articles or bottles in width with mechanism for holding the lowermost bottle in the stack. In prior devices some positive external force has been required to move the holding mechanism from one side of the stack to the other side. In the present invention a separate support is used for each column of bottles in the stack and the entire stack is supported by the support beneath the lowermost bottle. The article or bottle being dispensed moves the support to dispensing position and moves the latching mechanism thereof to position to lock the other support against movement. The next bottle in the other column engages its support and supports the stack. A single bottle at a time is dispensed from each stack in sequence from stack to stack.

In the dispensing mechanisms for the stacks proposed in the present application, the latches are actuated in a series of steps. The number of steps depends upon the number of stacks of bottles operated in sequence. The weight of the bottles is used to release the support beneath the bottle to be dispensed. The latches of the non-dispensing stacks are moved by the weight of the bottles in a series of steps, one step for each bottle dispensed. In the dispensed stack the latch moves to position to latch the support for the opposite and next bottle in the stack. No mechanical driving of the bottle support from one supporting position to the opposite supporting position takes place. Mechanical jamming of the mechanism is eliminated. The dispensing mechanism of the present concept is less costly to make and use. Service is less costly because of the elimination of electric motors and associated drives. The mechanism is capable of dispensing at a faster rate. The speed of actuation is advantageous in rush hours, permitting maximum sales. The mechanism of the present concept is simple to service; it eliminates vending errors; and is positive in operation.

The dispensing mechanism of each stack of bottles of the present concept is actuated in a series of steps for each bottle dispensed depending on the number of stacks of bottles, usually from two to six in number. A single bottle is dispensed from a single stack for each actuation of the mechanism with each stack dispensing in turn but all dispensing mechanisms are moved one step at each actuation. All bottles are moved downwardly one step at each actuation of the mechanism to bring the lowermost bottle in each stack closer to dispensing position. The bottles of each stack are not dropped a full diameter during each vending cycle but are lowered in fractional diameter stages depending again upon the number of stacks of bottles. This is a very important advantage since it reduces the shock due to the weight of the stack of bottles. Damage to bottles through rough handling is always a problem in vending mechanisms and minimizing such damage is important. Non-return bottles are more fragile than the standard returnable bottle and shock in the dispensing operation must be reduced to a minimum to prevent breakage of such non-return bottles. Lowering the entire stack of bottles in fractional diameter stages, as in the present concept, is therefore important when the apparatus is dispensing non-return bottles. Further, the compact and light weight character of the present dispensing mechanism permits the assembly for each stack to be resiliently mounted so that each column of bottles never actually drops in the true sense of the word. The entire assembly for each stack of botles rises to meet the descending column of bottles when a bottle is dispensed.

In the present dispenser when a coin is deposited or the switch in the electric circuit momentarily closed, a short pulse of electric current passes to the electrically energized means of each stack of bottles which suffices to actuate these means. These means then lift a latch for each stack of bottles which in turn releases a rock plate for each stack of bottles for a single step movement of a support beneath the lowermost bottle in each stack. The support beneath the lowermost bottle in the stack of bottles dispensing in timed sequence from stack to stack then moves the appropriate rock plate to position to lock an opposite bottle support. The lowermost bottle of the dispensing stack then moves to dispensing position and that stack of bottles moves downwardly until the next bottle in that stack of bottles engages the opposite bottle support. All of the other stacks of bottles also move downwardly a fraction of a diameter of a bottle. Only one bottle is dispensed. Deposit of another coin energizes all of the electrically energized means to dispense only one bottle from the next stack of bottles in the timed sequence and all the stacks of bottles again move downwardly by a fraction of a bottle diameter.

This cycle can be repeated as many times as there are bottles in the staggered stacks of bottles with each stack dispensing in turn so long as each cycle is started by the deposit of a coin or by the momentary closing of a switch in the electric circuit for the electrically energized means. The use of spaced oppositely disposed supports for alternately supporting the lowermost bottle in each staggered stack of bottles, and thus supporting the entire stack of bottles, with a rock plate moved stepwise from one support locking position to the other under the weight of the bottles with all rock plates moving one step during each dispensing operation permits great flexibility in the number of stacks of bottles. Any desired number of stacks of bottles not less than two can be used limited only by practical size of the dispenser with six stacks usually considered as a suitable maximum number.

The electrically energized or actuated means may be a solenoid, an electric motor or other suitable electrically actuated device for lifting the latch.

It is therefore an object of the present invention to provide novel dispensing mechanisms for dispensing one at a time a single article such as a bottle in sequence from staggered stacks of articles or bottles which mechanisms are actuated by the weight of the articles or bottles in each staggered stack and are stepwise actuated for dispensing a single article or bottle at a time by electrically energized means simultaneously actuating a latch for each stack of bottles.

Another object of the present invention is to provide such dispensing mechanisms in which the electrically energized means is a solenoid for each stack of bottles which can be momentarily actuated on the deposit of a coin or by the momentary closing of a switch in the solenoid circuit each to raise an associated latch to permit a support beneath the lowermost bottle in each stack to move downwardly a single step under the weight of the bottles to dispense the lowermost bottle in that stack of bottles conditioned for dispensing in the timed sequence of the several stacks, the next bottle in that stack engaging an oppositely disposed support which prevents that bottle from being dispensed and supports all of the remaining bottles in that stack with all of the bottles in the non-dispensing stacks having moved downwardly a fraction of a bottle diameter.

Another object of the present invention is to provide such dispensing mechanisms having spaced opposed pivoted supports for each stack of bottles for alternately supporting the bottles in each stack. The weight of the lowermost bottle and of the bottles thereabove in each stack is used to move the support adjacent the lowermost bottle stepwise downwardly in engagement with a stop mechanism. The stop mechanism is locked in position by a solenoid actuated latch, all latches being released when the solenoids are momentarily simultaneously energized, as by the deposit of a coin or by the momentary closing of a switch in the solenoid circuit. The weight of the bottles in the stacks then moves the adjacent support one step downwardly and moves the stop from beneath that support of the stack of bottles to be dispensed. That support then swings to position to dispense the lowermost bottle. The remainder of the bottles of the dispensed stack are then supported by the new lowermost bottle which engages the opposite support. This opposite support is prevented from dispensing movement by the associated stop. After dispensing the first bottle the first support is returned to its support position by the action of a spring. All bottles of all of the other stacks of bottles move downwardly a fraction of a bottle diameter during each dispensing cycle.

Another object of the present invention is to provide dispensing mechanisms utilizing a simple electric circuit in which the several solenoids are connected in parallel.

Other and further objects of the present invention will appear from the following description of an illustrative embodiment thereof having three staggered stacks in side by side position, it being understood that any suitable number of such stacks can be used.

The illustrative embodiment of the present invention described hereinafter should in no way be construed as defining or limiting the invention and reference should be had to the appended claims to determine the scope of the present inventive concept.

In the accompanying drawings, in which like reference characters indicate like parts, FIG. 1 is a front view of an embodiment of the present invention showing the relative position of the parts thereof in the timed dispensing cycle when the left bottle of the right stack has been dispensed and the right bottle of the left stack will be dispensed when the device is next actuated;

FIG. 3 is a view similar to that of FIG. 1 showing the several elements of the dispensing mechanism when the right bottle of the central stack has been dispensed and the right bottle of the right stack is in position to be dispensed;

FIG. 4 is a view similar to that of FIG. 1 showing the relative position of the parts in the timed dispensing cycle when the right bottle of the right stack has been dispensed and the left bottle of the left stack is in position to be dispensed;

FIG. 5 is a view similar to that of FIG. 1 showing the relative position of the several parts in the timed dispensing cycle when the left bottle of the left stack has been dispensed and the left bottle of the center stack is in position to be dispensed;

FIG. 6 is a view similar to that of FIG. 1 showing the relative position of the parts in the timed cycle when the left bottle of the center stack has been dispensed and the left bottle of the right stack is in position to be dispensed;

FIG. 7 is an exploded view of a part of the embodiment of FIG. 1 showing the bottle supports, rock plate, latch, latch release and return springs for one stack of bottles;

FIG. 8 is a front view in enlarged detail of a part of FIG. 1 showing the dispensing mechanism for one stack of bottles; and FIG. 9 is a view partly in section on the line 9—9 of FIG. 8.

Figure 1:
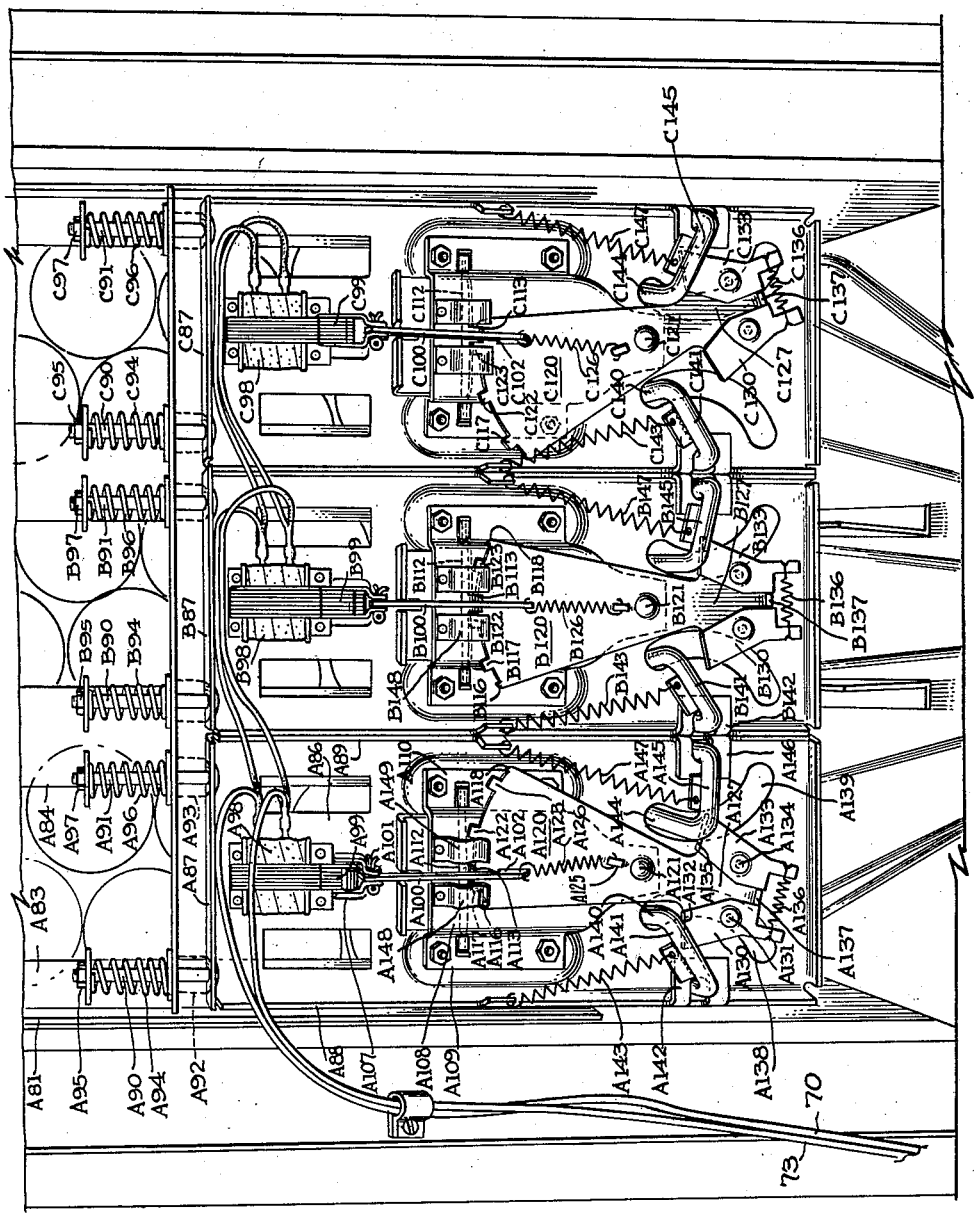

The illustrative embodiment hereinafter described has for purposes of description three side by side staggered stacks of bottles each stack having identical dispensing mechanism associated therewith. It should therefore suffice to describe one such dispensing mechanism. In the several figures the left stack and its dispensing mechanism will have the several parts identified by numerals preceded by "A"; the middle stack will have its component parts preceded by "B"; and the right stack will be identified by "C." It will be assumed that the mechanism of FIGS. 7, 8 and 9 is that of the left or "A" stack.

Referring to FIGS. 7, 8 and 9, a bin for the bottles has side walls A81 and A82 and a back wall, not shown. Inturned shoulders A83 and A84 extend from side walls A81 and A82, respectively, and cross plate A85 extends therebetween and is fastened thereto to constitute the front wall of the bin. Front plate A86 is provided with a forwardly extending top portion A87 and with forwardly extending side portions A88 and A89 and is mounted for free vertical movement within side walls A81 and A82 in front of and bearing against shoulders A83 and A84. A resilient suspension for front plate A86 and the elements of the release mechanism, to be described, as well as a resilient support for the bottles in the stack is provided by bolts A90 and A91 which extend through portion A87 and through cross plate A85 with spacers A92 and A93 therebetween. Spring A94 surrounds bolt A90 and bears against cross plate A85 and against a washer and nut A95 on bolt A90. Spring A96 surrounds bolt A91 and bears against cross plate A85 and against a washer and nut A97 on bolt A91. Springs A94 and A96 are under tension to provide a resilient support for the bottles and for the bottle supporting and dispensing structure.

Coil A98 is mounted on face plate A86 and is provided with armature A99 to which arm A100 is pivoted at A101. Arm A100 is provided with a latch engaging shoulder A102. A forked support A103 provides a guide for arm A100 at A105. Arm A100 is provided with an extension A106 which rides in a slot A107 in face plate A86 and is so arranged that, when brought into engagement with the upper end of slot A107, arm A100 is rotated in a clockwise direction as seen in FIG. 9 to rotate shoulder A102 out of engagement with the latch. This action permits latch A113 to drop back freely to its normal position even though arm A100 should for some reason remain in the up position.

A hollow wedge-shaped housing A108 is mounted on face plate A86 by its out turned flanges A109 and A110. A cross plate A112 carrying latch A113 is mounted for rotation in housing A108.

Rock plate A120 is pivoted at A121 to housing A108 and is provided with spaced stops A117, A122, and A123 and lugs A116 and A118 on its upper arcuate edge A124. Lugs A116 and A118 are primarily included as anti-rob features. As will be noted from the drawings, these lugs are designed to allow the latch to by-pass them during the vending motion. After vend is completed the rock plate starts back in the opposite direction. These lugs are beveled on their outer surface to allow the latch to cam over them to come against the adjacent stop so that the latch comes to rest between the stop and the lug. The number of stops therefore corresponds to the number of stacks of bottles. Rock plate A120 is provided with eye A125 to receive one end of spring A126 which extends between the lower end of arm A100 and eye A125.

Rock plate A120 is reduced in width at A127 to provide shoulders A128 and A129. Tumbler A130 is pivoted at A131 to rock plate A120 and has surface A132 thereof adjacent surface A128. Tumbler A133 is pivoted at A134 to rock plate A120 and has surface A135 thereof adjacent surface A129. A spring A136 extends between tumblers A130 and A133 and urges them against stop A137 carried by rock plate A120.

Plate A86 is provided with opposed arcuate slots A138 and A139. Bottle support rod A140 extends through slot A138 and is provided with a U-turned end A141 which is journaled for rotation in bracket A142 secured to extension A88 of plate A86. Spring A143 extends between end A141 and extension A88 to hold rod A140 resiliently in the upper end of slot A138.

Bottle support rod A144 extends through slot A139 and is provided with U-turned end A145 which is journaled for rotation in bracket A146 secured to extension A89. Spring A147 extends from end A145 to extension A89 to hold rod A144 resiliently in the upper end of slot A139.

Guides A148 and A149 are carried by housing A108 and extend outwardly beside latch A113 and downwardly over the upper edge of rock plate A120 to control the movement of latch A113 and to insure proper engagement of stops A117, A122, and A123 with latch A113.

The electric circuitry for coils A98, B98 and C98 is seen in FIGS. 1–7 and these coils are connected in parallel to any suitable source of electric current by wires 70 and 73.

When coil A98 is energized by the closing of the coin or manually actuated switch a pulse of current lifts armature A99 and arm A100 against the action of spring A126 lifting latch A113 to free whichever of stops A117, A122 or A123 is in engagement therewith. Extension A106 of arm A100 engaging the top of slot A107 moves shoulder A102 away from latch A113 allowing latch A113 to return to engagement with arcuate surface A124 of rock plate A120 on the other side of the released stop A117, A122 or A123 with rock plate A120 being moved one step by the weight of the stack of bottles upon the appropriate rod A140 or A144. The weight of the bottles on the appropriate rod A140 or A144 swings rock plate A120 ultimately in stepwise movement to the position where the rod A140 or A144 can slip over its associated tumbler A130 or A133 to dispense a bottle.

The stack of bottles is lowered a fraction of a diameter for each stepwise movement of plate A120 and the shock of the downward movement of bottles is absorbed by springs A94 and A96. When a bottle is dispensed the weight of the stack of bottles shifts to the other supporting rod tending to rotate rock plate A120 in the opposite direction so that the returning support rod is moved upward by its spring and must rotate its associated tumbler on its pivot against the action of spring A136 before it can return to the upper end of its arcuate slot.

The cycle of operation of the present invention is shown in FIGS. 1–6 and will be described hereinafter in detail. Before considering in detail the cycle of operation of the mechanism, it must be borne in mind that a mechanism having three side by side stacks, A, B and C, will be described but that any suitable number of staggered stacks can be arranged in side by side relationship and will operate in the same manner and sequence provided only that the rock plates have the required number of stops, there being one such stop for each staggered stack of bottles in the apparatus. It must also be kept in mind that each time a coin is deposited, or the electric circuit to the solenoid is momentarily closed, each solenoid is actuated, since the solenoids are connected in parallel, each latch is raised and then immediately released and each rock plate rotates one step. It follows, therefore, that all of the bottles in all of the staggered stacks of bottles move downwardly a fraction of a diameter each time a coin is deposited or the mechanism actuated with but a single bottle dispensed for each coin deposited or for each actuation of the mechanism.

As noted above, FIG. 1 shows the relative positions of the several parts of the present concept in the timed dispensing cycle when the left bottle of the right stack, stack C, has been dispensed and the right bottle of the left stack, stack A, is in position to be dispensed when the device is next actuated. In this figure, bottle support C141 has just returned to its upper position under the actuation of its spring C143 tripping tumbler C130 during its upward movement. The lowermost bottle in the staggered stack of bottles in stack C now rests upon support arm C145 which is held in position by shoulder C129 of rock plate C120. Latch C113 is in its lower position between stop C123 and lug C118 and prevents rotation of rock plate C120 in a clockwise direction.

In stack A rock plate A120 holds bottle support arm A145 in a lowered position with arm A145 resting on tumbler A133. The lowermost bottle of the staggered stack of bottles in stack A rests upon arm A145 while arm A141 is held in its upper position by spring A143 with no bottles resting thereon. Latch A113 is in its lower position between stops A117 and A122 preventing clockwise rotation of rock plate A120.

The staggered stack of bottles in stack B rest on support arm B145 which is supported by tumbler B133. Rock plate B120 is prevented from clockwise rotation by latch B113 which is in its lower position between stops B122 and B123. Support arm B141 is held in its upper position by spring B143 and carries no weight of bottles.

When a coin is deposited in the device or the electric circuit of wires 70 and 73 is momentarily closed, each of solenoids A98, B98 and C98 are energized simultaneously lifting arms A100, B100 and C100 to lift latches A113, B113 and C113. Each of extensions A106, B106 and C106 then engage the top of its respective slot A107, B107 and C107 to trip the arms to disengage shoulders A102, B102 and C102 from their respective latch to release the latches. In the meantime, the weight of bottles on support arms A145, B145 and C145 starts rotation of the rock plates A120, B120 and C120 in a clockise direction. Upon release of the latches A113, B113 and C113 the latches return to their lower position and fall between the next adjacent pair of stops limiting rotation of the rock plates to a single step.

In stack A, rock plate A120 moves one step in a clockwise direction so that latch A113 drops between lug A116 and stop A117. Support A145 is released and swings downwardly to dispense the bottle supported thereon and the next bottle in the staggered stack of bottles then moves downwardly into engagement with support arm A141 and moves arm A141 downwardly into engagement with shoulder A128 which would rotate rock plate A120 in a counter-clockwise direction but for latch A113 engaging stop A117.

In stack B, latch B113 returns to its lower positions and comes to rest between stops B117 and B122 and rock plate B120 moves one step in a clockwise direction under the action of the weight of the bottles on arm B145 which moves one step downward and closer to bottle dispensing position.

In stack C, latch C113 after lifting returns to its lower position between stops C122 and C123 permitting rock plate C120 to move one step in clockwise rotation under the action of the weight of the bottles on arm C145. Arm C145 and the bottles which it supports move downwardly one step and one step closer to dispensing position.

Figure 2:
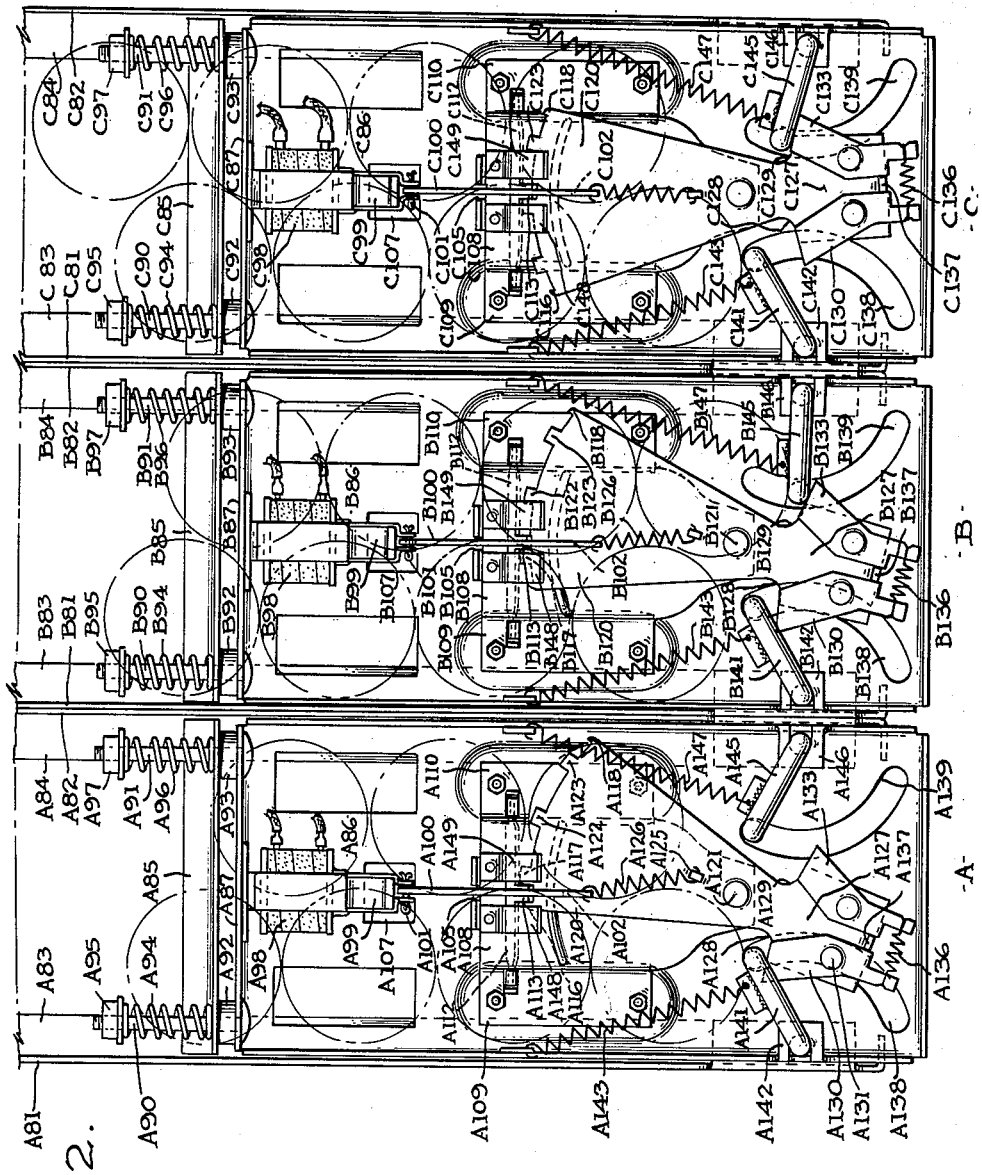
FIG. 2 is a view similar to that of FIG. 1 showing the relative position of the parts in the timed dispensing cycle when the right bottle of the left stack has been dispensed and the right bottle of the center stack is in position to be dispensed next.

Referring now to FIG. 2, after dispensing of the lower right bottle from stack A, support A145 is returned to its upper position by its spring A147 tripping tumbler A133 on its upward movement. The components then have the positions shown in FIG. 2. Thereafter when another coin is inserted in the mechanism or the electric circuit for the solenoids momentarily closed, the several solenoids are again actuated lifting the several latches and then immediately releasing the latches for return to their lower positions. Latch A113 then takes position between stops A117 and A122 permitting one step counter-clockwise rotation of rock plate A120 under the action of the weight of bottles on support arm A141 and arm A141 and the supported stack of bottles move downwardly a fraction of a bottle diameter. Latch B113 after lifting then comes to rest between lug B116 and stop B117 permitting rotation of rock plate B121 one step in a clockwise direction and arm B145 swings downwardly to dispense the lower right bottle of stack B. The staggered stack of bottles in stack B moves downwardly until the lower left bottle in the stack comes to rest upon support arm B141 which then engages shoulder B128 to tend to rotate rock plate B120 in a counter-clockwise direction but for the presence of latch B113 against stop B117.

In stack C, latch C113 after being raised comes to rest between stops C122 and C117 and the weight of the bottles on support C145 rotates rock plate C120 one step in a clockwise direction. Arm C145 moves downwardly a fraction of a diameter of a bottle one step closer to dispensing position and the stack of bottles moves downwardly in like amount.

When the solenoids are again energized, the latches are again raised and in stack A, latch A113 is lifted and rock plate A120 is rotated in counter-clockwise direction by the weight of the bottles on support A141. Latch A113 returns to lower position between stops A117 and A122 limiting rotation of rock plate A120 to one step and all of the bottles in stack A move downwardly a fraction of a diameter. In stack B lifting of latch B113 permits the weight of bottles on arm B145 to rotate rock plate B120 in clockwise direction and latch B113 returns to its lower position between stop B117 and lug B116. Arm B145 then swings downwardly to dispense the lowermost bottle in the staggered stack of bottles resting thereon and the staggered stack of bottles moving downward brings the lower left bottle into engagement with support B141. Support B141 moves downwardly into engagement with shoulder B128 which would tend to rock plate B120 in a counter-clockwise direction but for the presence of latch B113 between lug B116 and stop B117. After dispensing the bottle arm B145 is swung upwardly by its spring B147 tripping tumbler B133 in passing.

In stack C raising of latch C113 permits the weight of bottles on arm C145 to rotate rock plate C120 in a clockwise direction. Latch C113 returns to its lower position between stops C117 and C122 permitting rock plate C120 to move but one step; permitting arm C145 to move downwardly a fraction of a diameter of a bottle; and all of the staggered stack of bottles in stack C move downwardly a fraction of a diameter.

When the solenoids are again actuated and the latches are again lifted and return to their lower position, the position of the several elements in the timed cycle of operation is seen in FIG. 4. Latch A113 having lifted returns to position between stops A122 and A123 and rock plate A120 is rotated one step in counter-clockwise direction by the weight of the bottles on arm A141 which moves downwardly with the stack of bottles a fraction of a bottle diameter to position next adjacent dispensing position. In stack B, latch B113 lifts and permits one step counter-clockwise rotation of rock plate B120 under the action of the weight of the bottles on arm B141 which moves downwardly with the stack of bottles a fraction of a diameter and latch B113 returns to its lower position between stops B117 and B122.

In stack C, latch C113 raises and then returns to lower position between stop C117 and lug C116 permitting rock plate C120 to rotate in clockwise direction one step. The weight of the bottles on arm C145 then swings arm C145 downwardly dispensing the lower right-hand bottle in the staggered stack of bottles and the staggered stack of bottles moving downwardly a fraction of a diameter brings the lower left bottle onto arm C141. Arm C141 moves downwardly into engagement with shoulder C128 which would tend to rotate rock plate C120 in a counter-clockwise direction but for the presence of latch C113 in position against stop C117. In the meantime, arm C145, after releasing the dispensed bottle, is returned to its upper position by spring C147 tripping tumbler C133 during its upward movement.

The relative position of the several parts in the timed cycle of operation when the several solenoids are again energized is shown in FIG. 5. Lifting of latch A113 permits the weight of the bottles on arm A141 to rotate arm A141 downwardly rotating rock plate A120 one step in counter-clockwise direction. Latch A113 returns to its lower position between stop A123 and lug A118. Arm A141 continues its downward movement to dispense the bottle resting thereon and the staggered stack of bottles in stack A moves downwardly until the lower right bottle in the stack comes into engagement with support arm A145. Arm A145 is rotated into engagement with shoulder A129 which would tend to rotate rock plate A120 in a clockwise direction but for the engagement of latch A113 against stop A123. After dispensing the bottle arm A141 is returned to its upper position by spring A143 tripping tumbler A130 during its upward return movement.

In stack B, latch B113, having lifted, permits the weight of the bottles on support B141 to rotate rock plate B120 in counter-clockwise rotation one step and latch B113 comes to lower position between stops B122 and B123. Arm B141 and the staggered stack of bottles in column B move downwardly during movement of rock plate B120 a fraction of a bottle diameter.

In stack C, latch C113, on lifting, permits the weight of the bottles on arm C141 to rotate rock plate C120 one step in counter-clockwise rotation. Latch C113 returns to its lower position between stops C122 and C117. During this movement arm C141 and the staggered stack of bottles move downwardly in stack C a fraction of a bottle diameter. Stack B is now in position to dispense the lower left bottle in this stack when the solenoids are again energized.

When the solenoids are again energized by the deposit of a coin or by momentarily closing the parallel circuit to the solenoids, the several parts of the mechanism take the position in the timed cycle of operations seen in FIG. 6. Latch A113 upon raising releases rock plate A120 for one step clockwise rotation by reason of the weight of the bottles upon support arm A145. Latch A113 returns to position between stops A123 and A122. Arm A145 and the supported stack of bottles move downwardly a fraction of a bottle diameter.

In stack B, latch B113 upon raising permits rock plate B120 to rotate in a counter-clockwise direction one step. Latch B113 returns to its lower position between stop B123 and lug B118. Arm B141 continues its downward movement to dispense the bottle supported thereon. The stack of bottles in stack B moves down a fraction of a bottle diameter to bring the lower right bottle in the stack into engagement with support arm B145. The weight of the stack of bottles on arm B145 moves arm B145 into engagement with shoulder B129 which would tend to rotate rock plate B120 in clockwise direction but for the engagement between latch B113 and stop B123. In the meantime, after dispensing the bottle, arm B141 is returned to its upper position by spring B143 tripping tumbler B130 during its upward movement.

In stack C, lifting of latch C113 permits rock plate C120 to be moved one step in counter-clockwise rotation by the weight of the bottles on arm C141. Latch C113 comes to its lower position between stops C122 and C123. Arm C141 and the stack of bottles in stack C move downwardly a fraction of a bottle diameter. In this condition of the apparatus in the timed cycle, the lower left bottle in stack C is now in position to be dispensed when the solenoids are next actuated.

When the solenoids are again actuated, as by the deposit of a coin, the several elements of the device take the positions shown in FIG. 1 which figure has been described above. It will be recalled that, in this condition of the components of the device in the timed cycle of operation, the weight of the bottles in stack C has rotated arm C141 downwardly to dispense the bottle resting on that arm and the stack of bottles is now supported by arm C145 which engages the lower right bottle in the stack. After dispensing its bottle, arm C141 is returned to its upper position by its spring C143 tripping tumbler C130 as it passes on its upward movement.

The device will continue to operate in the manner described above dispensing but a single bottle at a time and dispensing from each staggered stack of bottles in sequence until all of the bottles in the device have been dispensed. The same sequence of timed operations will take place regardless of the number of staggered stacks arranged in side by side relation so long as one stop is provided on each rock plate for each staggered stack of bottles. The stepwise rotation of the rock plates is shortened as the number of plates is increased. The stepwise downward movement of the bottle supports and of the stacks of bottles is proportionately reduced as the number of stacks is increased. Reducing the size of the steps reduces the shock upon the apparatus and bottles during each dispensing movement. However, shock is absorbed by springs 90 and 91 of each stack since these springs tend to raise the bottle supporting mechanism to meet the downwardly moving stack of bottles when a bottle is dispensed.

It should now be apparent to those skilled in the art that the present invention in every way satisfies the several objectives discussed above.

Changes in or modifications to the above-described illustrative embodiments of this invention may now be suggested to those skilled in the art without departing from the present inventive concept. It is apparent, for example, that an electric motor or other suitable device may be substituted for the solenoid for raising the latch. Other articles than bottles may be dispensed by the described mechanisms and it is to be understood that all such articles are to be considered as included in the definition of a bottle or bottles in the following claims. Reference should therefore be had to the appended claims to determine the scope of this invention.

What is claimed is:

1. A mechanism for dispensing a single bottle at a time from staggered stacks of bottles in side by side bins, having two opposed bottle supports adjacent the lower end of each of said bins mounted for downward stepwise rotary movement from an upper normal position to bottle dispensing position and supporting in turn the lowermost bottle of the stack of bottles in the bin, latch means for each pair of said supports normally engaging and holding the support engaged by the lowermost bottle against downward rotation, spaced stops on each of said latch means corresponding in number to the number of said bins, a latch for each of said latch means normally disposed in engagement with one side of one of said stops, said stops providing a number of positions for said latch during the movement of a bottle to dispensing position corresponding to the number of said bins, the positions of said latch means differing from bin to bin progressively by one position, and separate means for simultaneously releasing each of said latches thereby releasing said latch means whereby the weight of the bottles rotates the bottle support beneath the lowermost bottle in each stack downward one step to dispense one bottle from one stack only and moves said latch means beneath the other bottle support of the dispensing stack preventing downward rotation thereof.

2. Mechanism as described in claim 1, each of said latch releasing means including a solenoid, said solenoids being connected in parallel.

3. In a mechanism for dispensing a single bottle at a time from a plurality of staggered stacks of bottles in side by side bins having spaced side walls and spaced front and back walls, two opposed bottle supports adjacent the lower end of each of said bins mounted for downward rotary movement from an upper normal position to bottle dispensing position and supporting in turn the lowermost bottle of the stack of bottles in the bin, a plate resiliently mounted between the side walls and in front of the front wall of each of said bins, journals on each of said plates for the respective ones of said supports, a housing spaced from and mounted on each of said plates adjacent said supports, a pivot on each of said housings, a rock plate mounted on each of said pivots, opposed shoulders on each of said rock plates each engaging in turn the adjacent one of said supports when the adjacent one of said supports first receives the weight of the bottles, a tumbler pivotally mounted on each of said rock plates adjacent each of said shoulders and forming extensions thereof, resilient means holding each of said tumblers in position extending its adjacent shoulder, each of said tumblers in turn being engaged by and rotated out of the path of the adjacent bottle support returning to its upper normal position, the improvement which comprises a plurality of spaced stops on each of said rock plates, corresponding in number to the number of said bins, a latch for each of said rock plates normally disposed in engagement with one side of one of said stops, said stops providing a number of positions for said rock plate during the movement of a bottle to dispensing position corresponding to the number of said bins, the position of said latch differing from bin to bin progressively by one position, and means mounted on each of said plates for simultaneously releasing said latches to thereby release said rock plates whereby the weight of the bottles moves the bottle supports beneath the lowermost bottle in each stack one step downward to dispense one bottle from one stack only and rotates the adjacent shoulder of said rock plate for the dispensing stack beneath the other bottle support of that stack preventing downward rotation thereof.

4. Mechanism as described in claim 3, having spring means resiliently holding said supports in upper position, said latch releasing means comprising a solenoid for each of said latches, an armature for said solenoid, an arm pivoted to said armature, a shoulder on said arm normally engaged beneath said latch, trip means rotating said arm out of engagement with said latch when said arm has moved said latch from said stops, spring means resisting movement of said arm by said solenoid and means for connecting said solenoids in parallel.

References Cited in the file of this patent

UNITED STATES PATENTS

| | | |
|---|---|---|
| 2,438,502 | Holt | Mar. 30, 1948 |
| 2,715,545 | Dolman | Oct. 28, 1952 |
| 2,825,488 | Nelson | Mar. 4, 1958 |